(12) United States Patent
Ahn et al.

(10) Patent No.: US 11,027,825 B2
(45) Date of Patent: Jun. 8, 2021

(54) SPLIT-AILERON CONTROL

(71) Applicant: BOMBARDIER INC., Dorval (CA)

(72) Inventors: Thomas Ahn, Pincourt (CA); Grace Shwu Jen Tang, Dorval (CA); Farzad Mokhtarian, Baie-D'Urfé (CA); Gerardus Herbertus de Kok, Dorval (CA); Sebastien Eric Benoit Vigneron, Montreal (CA)

(73) Assignee: BOMBARDIER INC., Dorval (CA)

( * ) Notice: Subject to any disclaimer, the term of this patent is extended or adjusted under 35 U.S.C. 154(b) by 180 days.

(21) Appl. No.: 16/312,599

(22) PCT Filed: Jun. 23, 2017

(86) PCT No.: PCT/IB2017/053779
§ 371 (c)(1),
(2) Date: Dec. 21, 2018

(87) PCT Pub. No.: WO2018/002799
PCT Pub. Date: Jan. 4, 2018

(65) Prior Publication Data
US 2019/0322356 A1    Oct. 24, 2019

Related U.S. Application Data

(60) Provisional application No. 62/356,767, filed on Jun. 30, 2016.

(51) Int. Cl.
*B64C 13/50* (2006.01)
*B64C 13/18* (2006.01)
(Continued)

(52) U.S. Cl.
CPC ............ *B64C 13/503* (2013.01); *B64C 13/18* (2013.01); *B64C 9/18* (2013.01); *B64C 2009/005* (2013.01); *G05D 1/0088* (2013.01)

(58) Field of Classification Search
USPC ........................................................ 701/3
See application file for complete search history.

(56) References Cited

U.S. PATENT DOCUMENTS

| | | | |
|---|---|---|---|
| 2,580,841 A | 1/1952 | Ross | |
| 2,936,975 A | 5/1960 | Strang et al. | |
| | (Continued) | | |

FOREIGN PATENT DOCUMENTS

| | | |
|---|---|---|
| GB | 619169 | 3/1949 |
| WO | 2015/065551 | 5/2015 |

OTHER PUBLICATIONS

International Search Report and Written Opinion dated Nov. 7, 2017 in PCT application No. PCT/IB2017/053779.

*Primary Examiner* — Tyler D Paige
(74) *Attorney, Agent, or Firm* — Norton Rose Fulbright Canada LLP

(57) ABSTRACT

The present disclosure provides methods and system for controlling the operation of an aircraft aileron which comprises an inboard portion and an outboard portion. A velocity of the aircraft is determined. Then, based on the velocity of the aircraft, the aileron is caused to move in certain ways. Below a first velocity threshold, the inboard aileron portion and the outboard aileron portion are caused to move substantially in unison. Between the first velocity threshold and a second, greater, velocity threshold, the outboard portion of the aileron is caused to lock and the inboard portion of the aileron is caused to move independently from the outboard portion. Above the second velocity threshold, the inboard portion is caused to move substantially opposite from the outboard portion.

23 Claims, 8 Drawing Sheets

(51) Int. Cl.
*B64C 9/18* (2006.01)
*G05D 1/00* (2006.01)
*B64C 9/00* (2006.01)

(56) References Cited

U.S. PATENT DOCUMENTS

| | | |
|---|---|---|
| 2,957,656 A | 10/1960 | Lewis et al. |
| 3,754,727 A | 8/1973 | Donovan |
| 4,146,200 A | 3/1979 | Borzachillo |
| 4,706,902 A * | 11/1987 | Destuynder ............ B64C 13/16 |
| | | 244/76 C |
| 5,082,207 A * | 1/1992 | Tulinius .................. B64C 3/44 |
| | | 244/76 R |
| 8,050,780 B2 | 11/2011 | Tessier et al. |
| 8,083,984 B2 | 12/2011 | Millar |
| 8,386,093 B2 | 2/2013 | Lin et al. |
| 8,651,431 B1 * | 2/2014 | White ................... B64C 23/076 |
| | | 244/218 |
| 2005/0242234 A1 * | 11/2005 | Mahmulyin ............ B64C 13/38 |
| | | 244/75.1 |
| 2007/0267548 A1 | 11/2007 | Ciholas et al. |
| 2009/0018703 A1 * | 1/2009 | Mangalam ............. G01M 9/06 |
| | | 700/282 |
| 2012/0138729 A1 * | 6/2012 | Hindman ................ F42B 15/01 |
| | | 244/3.21 |
| 2019/0202544 A1 * | 7/2019 | Mcclements ......... B64C 13/503 |
| 2019/0322356 A1 * | 10/2019 | Ahn ....................... B64C 13/18 |

* cited by examiner

SPLIT-AILERON CONTROL

CROSS-REFERENCE TO RELATED APPLICATIONS

The present application claims the benefit of U.S. Provisional Patent Application No. 62/356,767 filed on Jun. 30, 2016, the contents of which are hereby incorporated by reference.

TECHNICAL FIELD

The present disclosure relates generally to fly-by-wire aircraft, and more specifically to the control of split ailerons for fly-by-wire aircraft.

BACKGROUND OF THE ART

While traditional aircraft were largely mechanical systems, many modern aircraft have adopted so-called "fly-by-wire" technology. Put briefly, traditional aircraft use mechanical linkages to translate an operator command, such as a pedal being pressed or a flight stick being tilted, to cause flight components to move, for example an aileron being raised or lowered. In contrast, fly-by-wire aircraft convert commands, such as from an operator, into electrical signals, whether analog or digital. A fly-by-wire controller processes the received commands to generate control signals which are then sent to flight components. The flight components then modify their behavior based on the received signals.

In aircraft aerodynamics, a reversal velocity of an aircraft is a velocity at which flight controls of the aircraft reverse themselves due to aeroelasticity of a wing on which control surfaces, which are actuated by the flight controls, are located. This phenomenon, called control reversal, is caused when the amount of airflow over the wing is sufficient to induce torsional deformation of the wing structure, and can be due to a lack of torsional stiffness of the wing. While all aircraft wings are designed to provide sufficient torsional stiffness, many existing techniques rely on using stronger, heavier materials, or having more complex supporting structures. This in turn means that aircraft with lighter or more flexible wings must limit their operating velocity in order to avoid control reversal.

As such, there is a need for a method of avoiding control reversal while maintaining high operating velocities.

SUMMARY

The present disclosure provides methods and system for controlling the operation of an aircraft aileron which comprises an inboard portion and an outboard portion. A velocity of the aircraft is determined. Then, based on the velocity of the aircraft, the aileron is caused to move in certain ways. Below a first velocity threshold, the inboard aileron portion and the outboard aileron portion are caused to move substantially in unison. Between the first velocity threshold and a second, greater, velocity threshold, the outboard portion of the aileron is caused to lock and the inboard portion of the aileron is caused to move independently from the outboard portion. Above the second velocity threshold, the inboard portion is caused to move substantially opposite from the outboard portion.

In accordance with a first broad aspect, there is provided a method for controlling operation of an aircraft aileron comprising an inboard portion and an outboard portion. The method comprises determining a velocity of the aircraft; when the velocity is below a first threshold, causing the inboard aileron portion and the outboard aileron portion to move substantially in unison; when the velocity is above the first threshold and below a second threshold greater than the first threshold, causing the outboard portion of the aileron to lock and causing the inboard portion of the aileron to move independently from the outboard portion; and when the velocity is above the second threshold, causing the outboard portion of the aileron to move substantially opposite from the inboard portion.

In some embodiments, the method further comprises, when the velocity is below the first threshold, generating and transmitting a first aileron control signal for causing the inboard portion to move independently from the outboard portion; when the velocity is above the first threshold and below the second threshold, generating and transmitting a second aileron control signal for causing the inboard portion of the aileron to move independently from the outboard portion; and when the velocity is above the second threshold, generating and transmitting a third aileron control signal for causing the outboard portion of the aileron to move substantially opposite from the inboard portion.

In some embodiments, the aileron comprises a middle portion, the method further comprising, when the velocity is below a first threshold, causing the middle portion, the inboard portion and the outboard portion to move substantially in unison.

In some embodiments, the aileron comprises a middle portion, the method further comprising, when the velocity is above the first threshold, causing the middle portion to lock.

In some embodiments, the method further comprises generating and transmitting a fourth aileron control signal for effecting control of the middle portion.

In some embodiments, the method further comprises receiving an operator command for steering the aircraft from an operator control, and determining the velocity of the aircraft comprises determining the velocity at a time of receipt of the operator command.

In some embodiments, the method further comprises receiving an autopilot command for steering the aircraft, and determining the velocity of the aircraft comprises determining the velocity at a time of receipt of the autopilot command.

In some embodiments, at least one of the first threshold and the second threshold is computed dynamically based on at least one of an altitude, a Mach number, and environmental conditions for the aircraft.

In some embodiments, at least one of the first threshold and the second threshold is determined via a lookup table.

In some embodiments, the second threshold is approximately a maximum operating velocity of the aircraft.

In some embodiments, the maximum operating velocity of the aircraft is defined as approximately 85% of a dive velocity of the aircraft.

In some embodiments, at least one of the first threshold and the second threshold is defined as a percentage of a reversal velocity of the aircraft in a given operating mode of the aileron.

In some embodiments, sending the at least one third aileron control signal is performed when the velocity is above the second threshold and below a third threshold.

In some embodiments, the third threshold is approximately a dive velocity of the aircraft.

In some embodiments, at least one of the first threshold and the second threshold is a range.

In some embodiments, the first threshold is a range having a lower bound and an upper bound, the method further comprising, between the lower bound and the upper bound of the range of the first threshold, causing the outboard portion of the aileron to progressively lock and causing the inboard portion of the aileron to move independently from the outboard portion.

In some embodiments, causing the outboard portion of the aileron to progressively lock comprises changing a deflection ratio of the outboard portion of the aileron to the inboard portion of the aileron as a function of the velocity of the aircraft.

According to another broad aspect, there is provided a system for controlling operation of an aircraft aileron comprising an inboard portion and an outboard portion. The system comprises a processing unit and a non-transitory memory communicatively coupled to the processing unit and comprising computer-readable program instructions. The program instructions are executable by the processing unit for determining a velocity of the aircraft; when the velocity is below a first threshold, causing the inboard aileron portion and the outboard aileron portion to move substantially in unison; when the velocity is above the first threshold and below a second threshold greater than the first threshold, causing the outboard portion of the aileron to lock and causing the inboard portion of the aileron to move independently from the outboard portion; and when the velocity is above the second threshold, causing the outboard portion of the aileron to move substantially opposite from the inboard portion.

In some embodiments, the program instructions are further executable by the processing unit for, when the velocity is below the first threshold, generating and transmitting a first aileron control signal for causing the inboard portion to move independently from the outboard portion; when the velocity is above the first threshold and below the second threshold, generating and transmitting a second aileron control signal for causing the inboard portion of the aileron to move independently from the outboard portion; and when the velocity is above the second threshold, generating and transmitting a third aileron control signal for causing the outboard portion of the aileron to move substantially opposite from the inboard portion.

In some embodiments, the aileron comprises a middle portion and the program instructions are further executable by the processing unit for, when the velocity is below a first threshold, causing the middle portion, the inboard portion and the outboard portion to move substantially in unison.

In some embodiments, the aileron comprises a middle portion and the program instructions are further executable by the processing unit for, when the velocity is above the first threshold, causing the middle portion to lock.

In some embodiments, the program instructions are further executable by the processing unit for generating and transmitting a fourth aileron control signal for effecting control of the middle portion.

In some embodiments, the program instructions are further executable by the processing unit for receiving an operator command for steering the aircraft from an operator control, and determining the velocity of the aircraft comprises determining the velocity at a time of receipt of the operator command.

In some embodiments, the program instructions are further executable by the processing unit for receiving an autopilot command for steering the aircraft, and determining the velocity of the aircraft comprises determining the velocity at a time of receipt of the autopilot command.

In some embodiments, at least one of the first threshold and the second threshold is computed dynamically based on at least one of an altitude, a Mach number, and environmental conditions for the aircraft In some embodiments, at least one of the first threshold and the second threshold is determined via a lookup table.

In some embodiments, the second threshold is approximately a maximum operating velocity of the aircraft.

In some embodiments, the maximum operating velocity of the aircraft is defined as approximately 85% of a dive velocity of the aircraft.

In some embodiments, at least one of the first threshold and the second threshold is defined as a percentage of a reversal velocity of the aircraft in a given operating mode of the aileron.

In some embodiments, sending the at least one third aileron control signal is performed when the velocity is above the second threshold and below a third threshold In some embodiments, the third threshold is a dive velocity of the aircraft.

In some embodiments, at least one of the first threshold and the second threshold is a range.

In some embodiments, the first threshold is a range having a lower bound and an upper bound, the program instructions further executable for, between the lower bound and the upper bound of the range of the first threshold, causing the outboard portion of the aileron to progressively lock and causing the inboard portion of the aileron to move independently from the outboard portion.

In some embodiments, causing the outboard portion of the aileron to progressively lock comprises changing a deflection ratio of the outboard portion of the aileron to the inboard portion of the aileron as a function of the velocity of the aircraft.

Features of the systems, devices, and methods described herein may be used in various combinations, and may also be used for the system and computer-readable storage medium in various combinations.

BRIEF DESCRIPTION OF THE DRAWINGS

Further features and advantages of embodiments described herein may become apparent from the following detailed description, taken in combination with the appended drawings, in which.

It will be noted that throughout the appended drawings, like features are identified by like reference numerals.

DETAILED DESCRIPTION

A multi-stage control technique is applied for operating split ailerons of an aircraft with flexible wings in order to raise the reversal velocity of the aircraft. A velocity of the aircraft is determined, optionally in response to receipt of a command to steer the aircraft. Then, based on the velocity of the aircraft, the portions of the split aileron are caused to behave differently. Below a first velocity threshold, an inboard portion and an outboard portion of the aileron are caused to move substantially together. Between the first velocity threshold and a second, greater, velocity threshold, the outboard portion of the aileron is caused to be locked and an inboard portion of the aileron is caused to move independently from the outboard portion. Above the second velocity threshold, the inboard portion is caused to move substantially opposite from the outboard portion.

Figure 1:
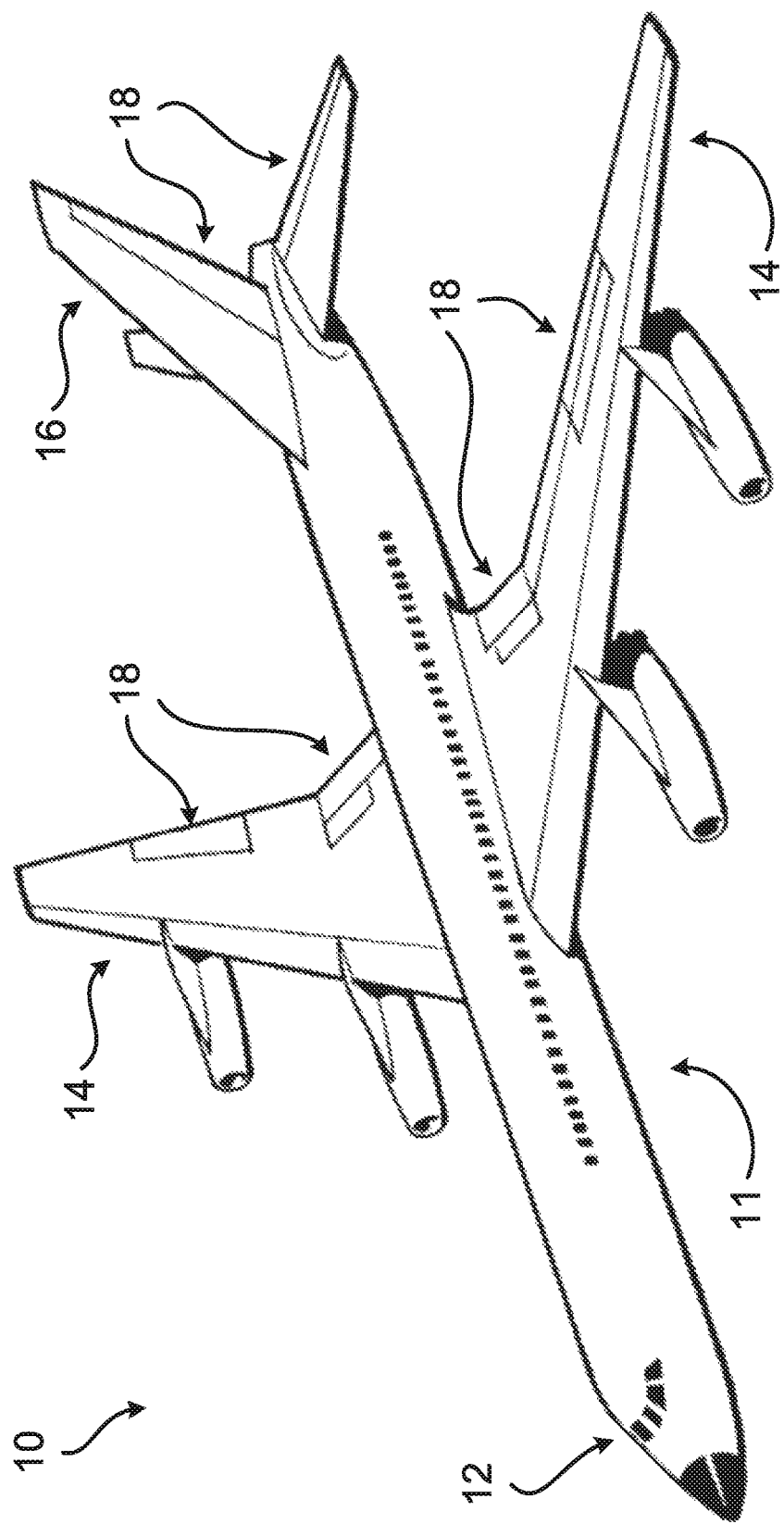
FIG. 1 is a diagram of an example aircraft.

With reference to FIG. 1, a typical modern aircraft 10, having a fuselage 11, a pair of wings 14, and a tail 16, is equipped with a cockpit 12 and one or more flight components 18. The aircraft 10 can be any type of aircraft, including propeller planes, jet planes, turbojet planes, turbopropeller planes, turboshaft planes, gliders, and the like. The cockpit 12 may be positioned at any suitable location on the aircraft 10, for example at a front portion of the fuselage 11. The cockpit 12 is configured for accommodating one or more pilots who control the operation of the aircraft 10 by way of one or more operator controls (not illustrated). The operator controls may include any suitable number of pedals, yokes, steering wheels, centre sticks, flight sticks, levers, knobs, switches, and the like.

The flight components 18 can be positioned at any suitable location on the aircraft 10, and may include any suitable number of ailerons, airbrakes, elevators, flaps, flaperons, rudders, spoilers, spoilerons, stabilators, trim tabs, and the like. In one particular embodiment of the aircraft 10, each wing 14 is equipped with at least one aileron, and the tail 16 has at least one rudder and at least one elevator. The aircraft 10 can also be equipped with any number of additional suitable flight components 18.

Figure 2:
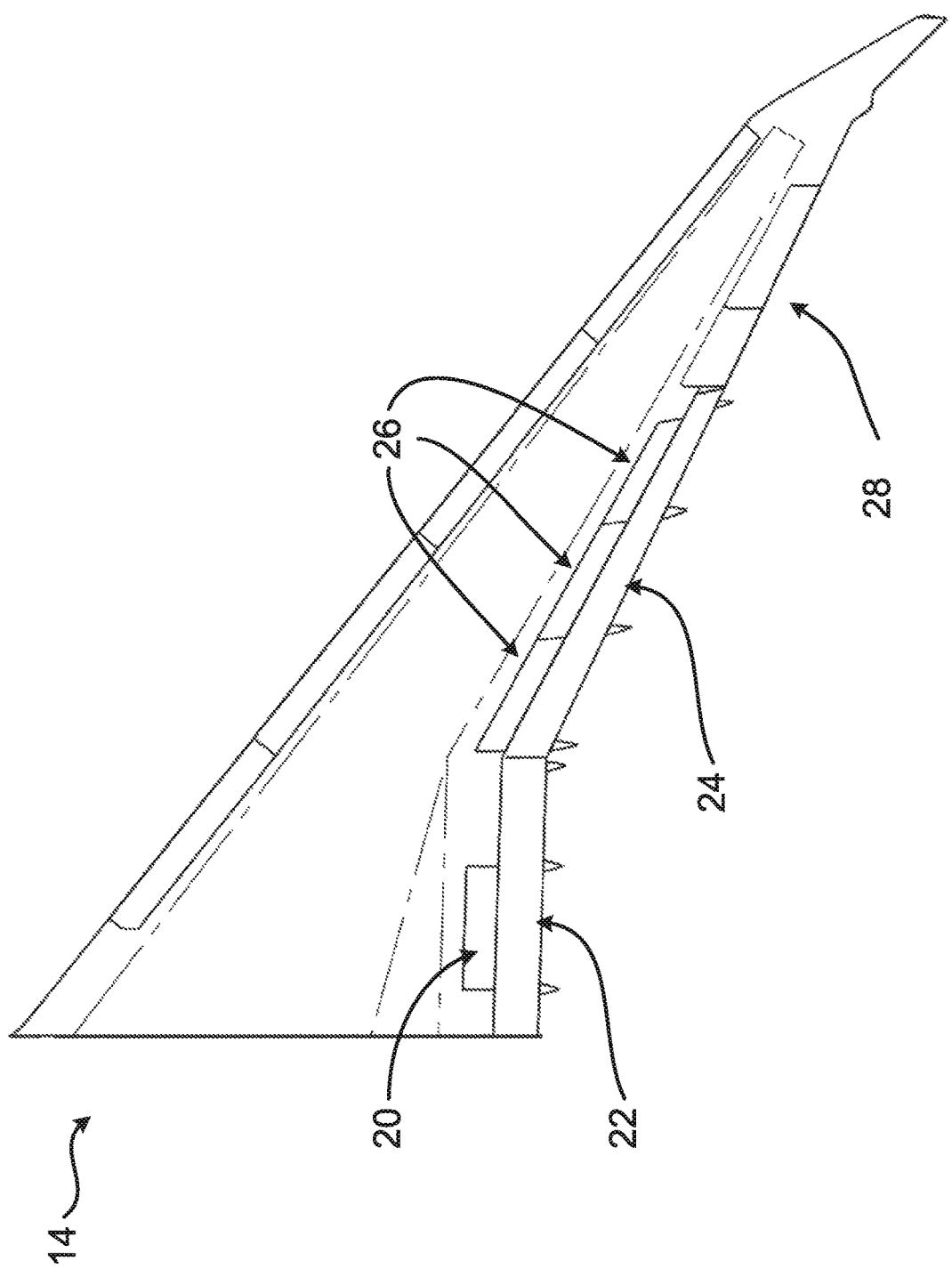
FIG. 2 is a diagram of an example wing of the aircraft of FIG. 1.

With reference to FIG. 2, in some embodiments the wing 14 is configured with a plurality of flight components 18. For example, the wing 14 is a flexible wing, and has a ground spoiler 20, an inboard flap 22, an outboard flap 24, a multi-function spoiler 26, and a split aileron 28. The split aileron 28 is composed of a plurality of portions which may vary in shape and size. The split aileron portions may be rectangular, trapezoidal, square, parallelogram-like, or may take on any other suitable shape. In some embodiments, the portions of the split aileron 28 are all of the same shape and/or size, and in other embodiments the portions are of different shapes and/or sizes. In some embodiments, the portions of the split aileron 28 are adjacent, and in other embodiments one or more wing structures (not illustrated) of the wing 14 is disposed between the portions of the split aileron 28. The split aileron 28 may be split into two, three, four, or five portions, or may be split into any other suitable number of portions.

Figure 3:
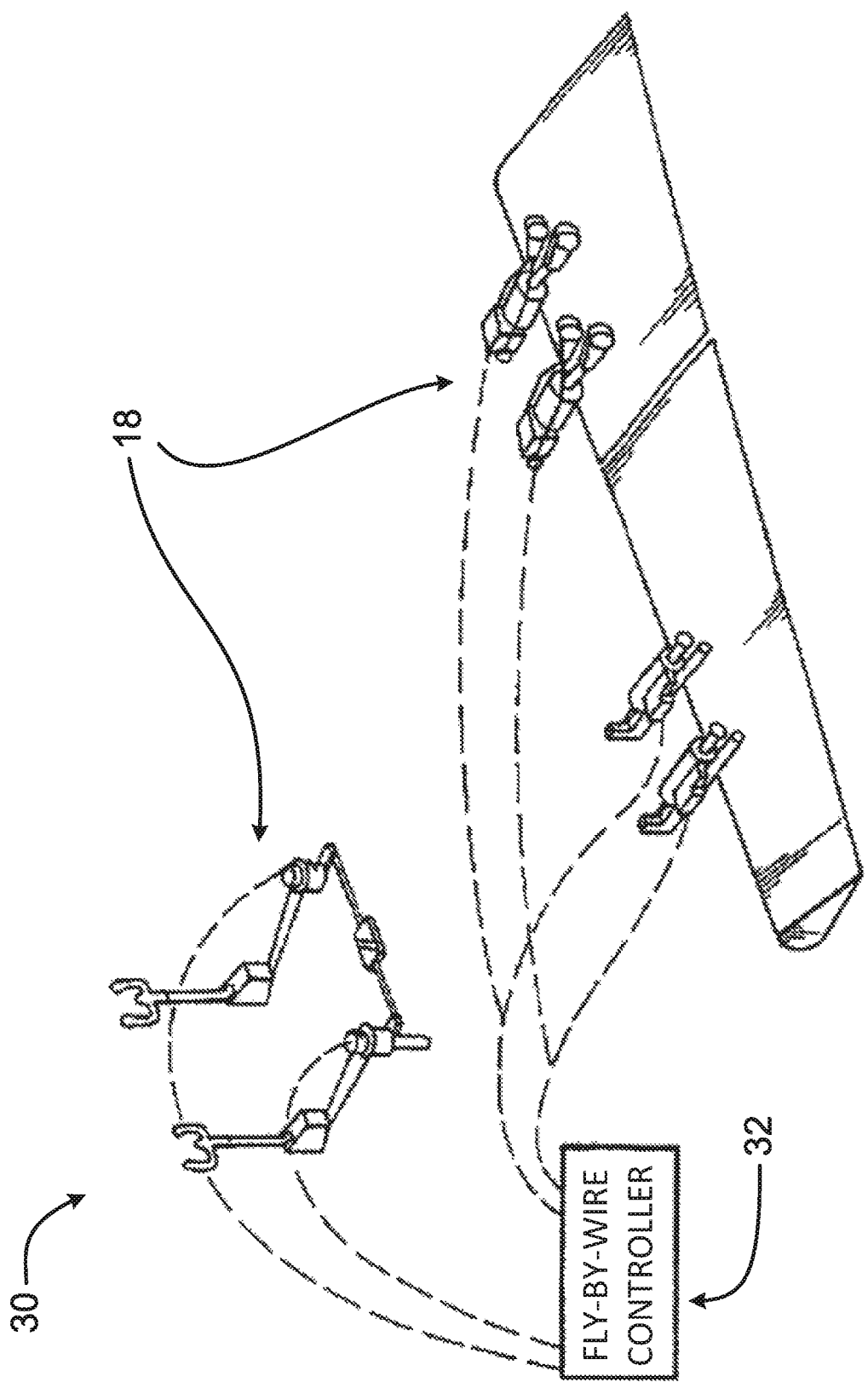
FIG. 3 is a block diagram of an example fly-by-wire implementation, according to an embodiment.

With reference to FIG. 3, the aircraft 10 may use a fly-by-wire (FBW) control system 30 which has a FBW controller 32 which controls the operation of the flight components 18, including the split aileron 28. In the FBW control system 30, there is no direct mechanical coupling between the operator controls and the flight components 18. The FBW control system 30 may include the operator controls which provide operator commands, in the form of electrical signals, to the FBW controller 32. The FBW controller 32 may receive commands from other elements, for example an autopilot system, and may combine the commands with other aircraft data to produce flight control signals. Instead of mechanical linkages and their attendant displacement/translation, the commands are transmitted across wires to electrically control the movement of actuator/motors that move the flight components 18. For purposes of safety, the FBW control system 30 includes redundant components (not illustrated) so that if one component of the FBW control system 30 fails, the aircraft 10 can still be safely controlled. In some embodiments, redundancy is provided on an axis-by-axis basis. For example, the FBW control system 30 has separate systems that control the movement of the aircraft 10 in each of the roll, pitch and yaw axes.

In some embodiments, the split aileron 28 is controlled by a single actuator/motor which moves each of the portions of the split aileron 28 in accordance with aileron control signals sent by the FBW controller 32. In other embodiments, each of the portions of the split aileron 28 is provided with a separate actuator/motor. In still further embodiments, one or more portions of the split aileron 28 share an actuator/motor, and one or more other portions of the split aileron 28 are provided with separate actuators/motors, as appropriate. The FBW controller 32 is configured for providing aileron control signals to the actuators/motors which move each of the portions of the split aileron 28.

Figure 4:
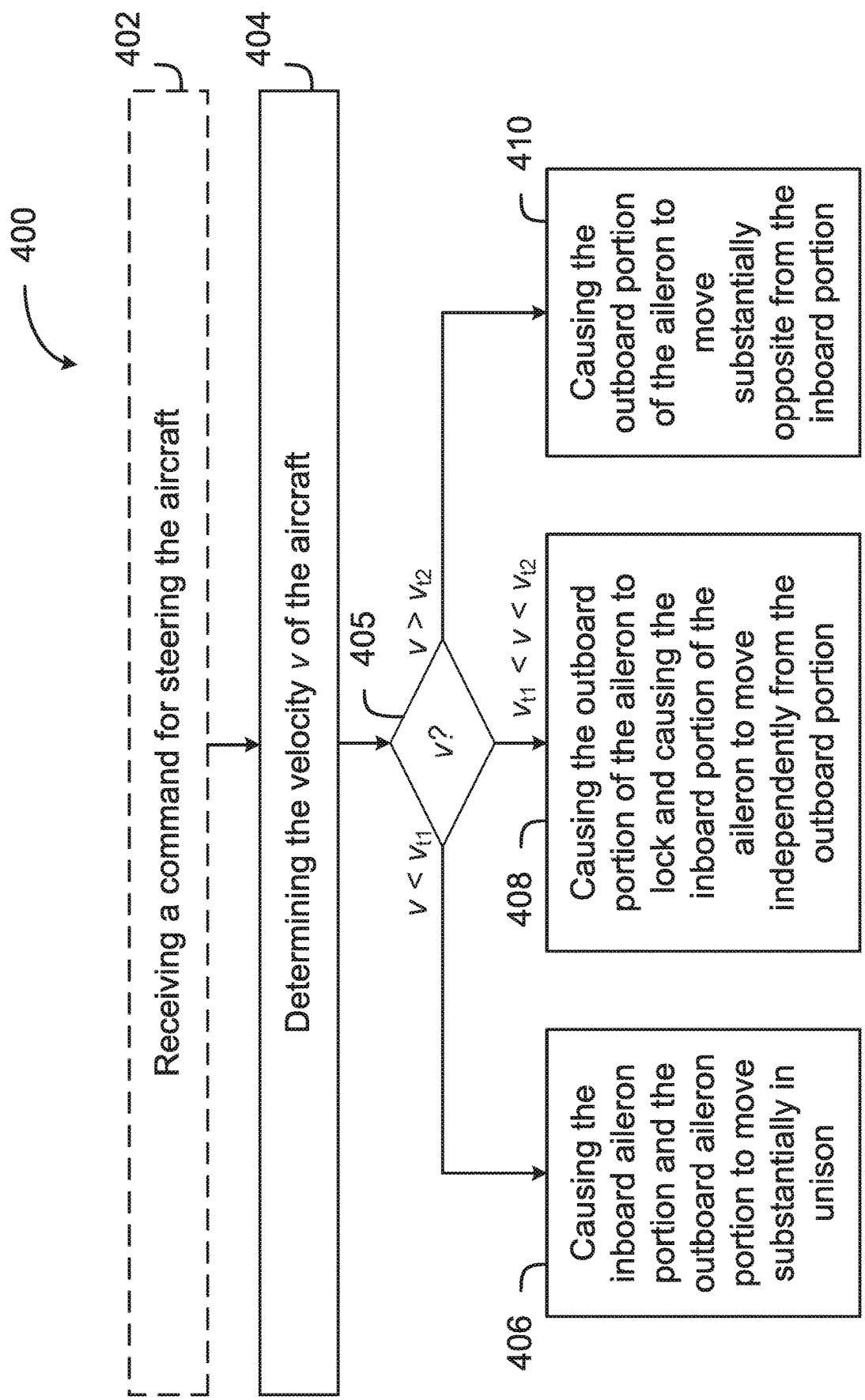
FIG. 4 is flowchart of a method for controlling a split aileron of an aircraft in accordance with an embodiment.

With reference to FIG. 4, the FBW control system 30 is configured for implementing a method 400 for controlling operation of an aircraft aileron, such as the split aileron 28 of the aircraft 10. Optionally, at step 402, a command for steering the aircraft 10 is received at the FBW controller 32, or other element of the FBW control system 30. The command may be received from any suitable operator control, for example from a flight yoke, a flight stick, and the like, which may be located in the cockpit 12. Alternatively, the command may be received from an unmanned control module configured for controlling the aircraft 10 in lieu of a pilot. Alternatively still, the command may be received from a remote source outside the aircraft 10 if the aircraft 10 is piloted remotely, either by a remote pilot or by a remote unmanned control module. Additionally, the command may be received as an analog electrical signal or a digital electrical signal, and may be received in any suitable format. The received command may be indicative of a desire to steer the aircraft 10 in a particular direction, and may be translated into one or more control signals to be sent to the flight components 18. The command may be received, for example, by the FBW controller 32, or by another suitable element of the FBW control system 30.

At step 404, the velocity v of the aircraft 10 is determined. The velocity v may be determined by any suitable means, for example by way of a global positioning system (GPS). Alternatively, or in addition, the velocity v may be determined via one or more sensors located on the aircraft 10, such as a pitot tube, a pitot-static system, and the like. In some embodiments, the velocity v of the aircraft 10 may be determined in response to step 402 being performed. In some other embodiments, the velocity v of the aircraft 10 is continuously monitored, for example by the FBW controller 32, or by other suitable components of the FBW system 30, and may be logged in a memory or other data storage device. In some such embodiments, the velocity v can be logged in conjunction with a timestamp. In embodiments where step 402 is performed, a timestamp for the command can be obtained, and the velocity v of the aircraft 10 can be determined based on comparisons of the command timestamp and the logged velocity timestamps. In another example, a processing delay between receiving the command and determining the velocity v of the aircraft 10 is known, or can be reasonably approximated, and the velocity v at the time of receipt of the command is set as the velocity of the aircraft 10 at a time equal to the present time minus the known, or approximated, delay. In some other embodiments, the velocity v is acquired from a sensor, or other means, in response to receipt of the command.

Once the velocity v of the aircraft 10 is determined, the method 400 moves to one of steps 406, 408, and 410, depending on the velocity v of the aircraft 10. Decision box 405 is indicative of the decision-making step performed to select one of steps 406, 408, and 410, to cause the split aileron 28 to operate in one of a plurality of modes. If the velocity v is less than a first threshold velocity $v_{t1}$, the method 400 moves to step 406. If the velocity v is greater than the first threshold velocity $v_{t1}$ but less than a second threshold velocity $v_{t2}$ (with $v_{t2}$ being greater than $v_{t1}$), the method 400 moves to step 408. If the velocity v is greater than the second threshold velocity $v_{t2}$, the method 400 moves to step 410. In some embodiments, the method 400 only moves to step 410 if the velocity v is greater than the second threshold velocity $v_{t2}$ but less than a third threshold velocity $v_{t3}$. In these embodiments, a fourth choice (not illustrated) is available in the decision box 405 if the velocity v of the aircraft 10 is above the third threshold velocity $v_{t3}$.

The threshold velocities may be defined as based on any suitable characteristic of the aircraft 10. For example, the threshold velocities may vary with the flexibility of the wings 14, the length and/or shape of the wings 14, the location of the wings 14 on the fuselage 11, and the like. Additionally, or alternatively, the threshold velocities may vary based on environmental conditions, such as wind heading and wind speed, altitude, temperature, and the like. In some embodiments, the threshold velocities are computed dynamically by, for example, the FBW controller 32, based on aircraft characteristics and/or environmental conditions. In other embodiments, the FBW controller is provided with one or more lookup tables which are used to determine the threshold velocities based on aircraft characteristics and/or environmental conditions. In some embodiments, one or more of the threshold velocities may be a velocity range. In some embodiments, the FBW controller 32 is provided with a method and/or a lookup table for determining the reversal speed, and is configured for determining the associated threshold velocities as a function of the reversal speed.

Figure 5:
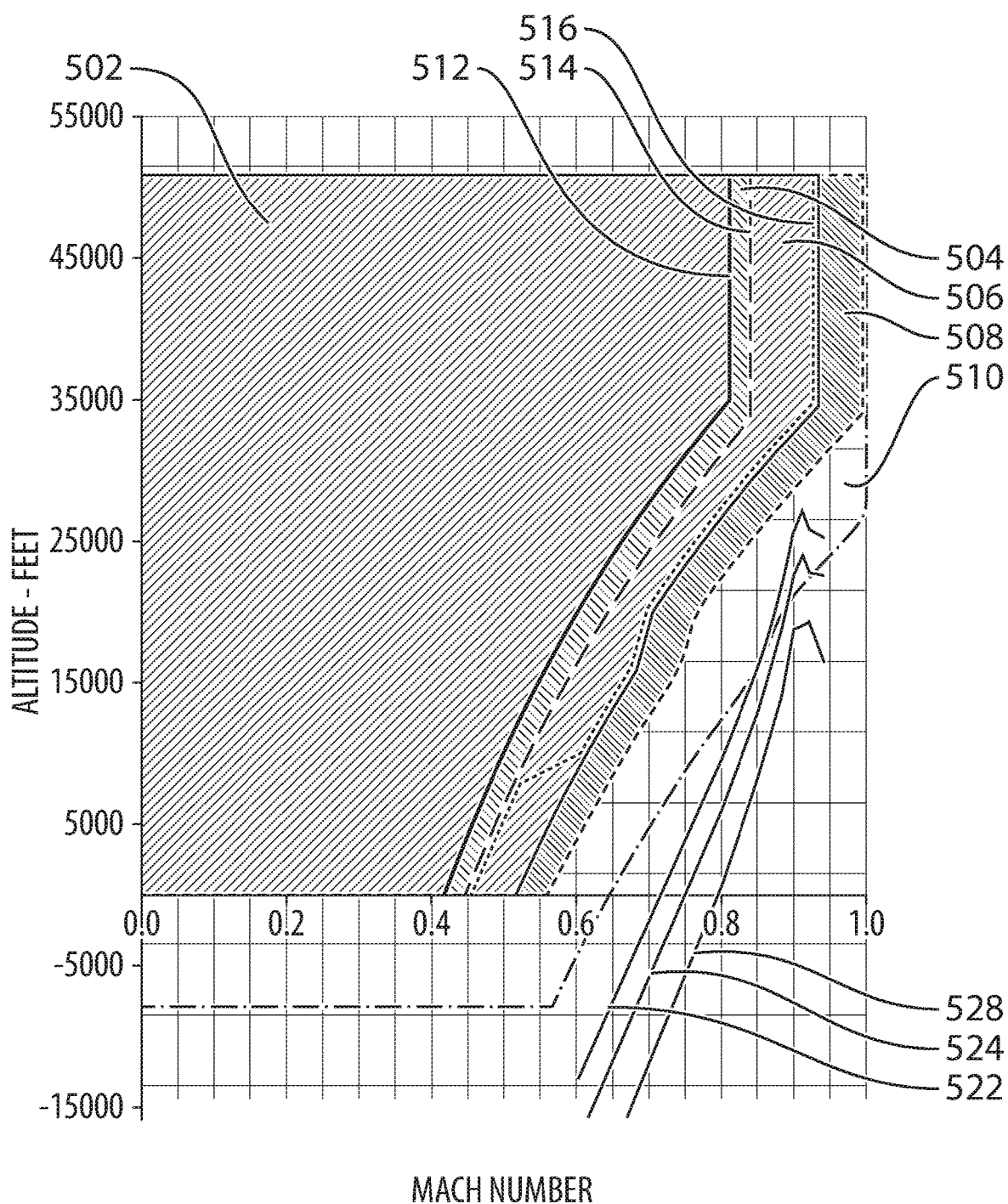
FIG. 5 is a graphical representation of example regions of operation of different split aileron control modes.

With reference to FIG. 5, the threshold velocities may be defined as curves which vary based on any number of parameters, as discussed hereinabove, and different regions of operation may be defined based on the threshold velocities. For example, FIG. 5 plots altitude against Mach number, and a plurality of regions 502, 504, 506, 508 are illustrated, each associated with one of the operation modes of the split aileron 28. Region 502 is delimited on the right side by curve 512, which represents a lower bound of the first threshold velocity $v_{t1}$; in this example, the first threshold velocity $v_{t1}$ is a velocity range. As altitude increases, the Mach number of the lower bound of the first threshold velocity $v_{t1}$ also increases, until a plateau at approximately 35,000 ft. Region 506 is delimited on the left side by curve 514 and on the right side by curve 516, which are an upper bound of the first threshold velocity $v_{t1}$ and the second threshold velocity $v_{t2}$, respectively. Region 504 is a transitional region between the lower and upper bounds of the first threshold velocity $v_{t1}$. Region 508 is delimited on the left side by curve 516, the second threshold velocity $v_{t2}$.

Thus, if the velocity v of the aircraft 10 is below curve 512, the method 400 moves to step 406. If the velocity v of the aircraft 10 is between curves 514 and 516, the method 400 moves to step 408. If the velocity v of the aircraft 10 is greater than curve 516, the method 400 moves to step 410.

If the velocity v of the aircraft 10 is between curves 512 and 514, i.e. in the transitional region between the lower and upper bounds of the first threshold velocity $v_{t1}$, the method 400 may move to step 406, to step 408, or to another step (not illustrated), as appropriate.

In some embodiments, one or more threshold velocities may be defined based on a maximum operating velocity of the aircraft, a dive velocity of the aircraft, or any other suitable defined velocity, which may be a groundspeed velocity, an airspeed or Mach number, or any other suitable velocity. The maximum operating velocity may vary across aircraft 10, including depending on the operating mode, and can be based on any number of physical characteristics of the aircraft 10. In some embodiments, the second threshold velocity $v_{t2}$ is set at or near a maximum operating velocity of the aircraft 10, and the optional third threshold velocity $v_{t3}$ may be set at or near a dive velocity and/or a "never exceed" velocity of the aircraft 10. In some cases, the threshold velocities are defined as a given percentage, such as 85% or 80%, of the reversal velocity for the aircraft 10 in the given operating mode of the split aileron 28, or as any suitable fraction of the reversal velocity. In some cases, the relationship between the threshold velocities and the reversal velocity is determined by regulatory bodies in one or more competent jurisdictions.

For example, and with continued reference to FIG. 5, different reversal velocities may exist for the aircraft 10 depending on the operating mode of the split aileron 28, and/or the altitude, Mach number, and/or environmental conditions of the aircraft 10. Thus, in the operating mode of step 406, the reversal velocity of the aircraft 10 is illustrated by curve 522, in the operating mode of step 408, the reversal velocity of the aircraft 10 is illustrated by curve 524, and in the operating mode of step 410, the reversal velocity of the aircraft 10 is illustrated by curve 526. The gap between the respective reversal velocities and the threshold velocities is illustrated by clearance envelope 510. The clearance envelope may aim to provide at 15%, 20%, or any other suitable gap, between the threshold velocities and the reversal velocity of the aircraft 10.

When the velocity v of the aircraft 10 is less than the first threshold velocity $v_{t1}$, the method 400 moves to step 406, and a first aileron control signal is sent. The first aileron control signal may be sent to the split aileron 28, or to a controller thereof. The first aileron control signal causes a plurality of portions of the split aileron 28 to move substantially in unison. Thus, if the split aileron 28 is signaled to move upwards, a plurality of portions of the split aileron 28 will move upwards substantially together. In embodiments where the split aileron 28 is divided into two portions, both portions move substantially together. In embodiments where the split aileron 28 is divided into three or more portions, at least two of the portions move substantially together. For example, for a split aileron 28 with three portions, the two more outboard portions move together, while a more inboard portion remains in a neutral position. Alternatively, a more inboard portion and a more outboard portion move together, while a middle portion remains in a neutral position. Alternatively still, two portions move substantially in unison, and a third portion moves in the same direction, but to a lesser or greater degree. Still other implementations are possible.

When the velocity v of the aircraft 10 is between the first threshold velocity $v_{t1}$ and the second threshold velocity $v_{t2}$ the method 400 moves to step 408, and a second aileron control signal is sent. The second aileron control signal may be sent to the split aileron 28, or to the split aileron controller. The second aileron control signal causes at least one outboard portion of the split aileron 28 to lock and causes an inboard portion to move independently from the outboard portion. The at least one outboard portion may lock in a substantially neutral position, for example one that is flush with the rest of the wing 14 of which it is a part. Alternatively, the at least one outboard portion may lock in any other suitable position. The at least one inboard portion moves independently from the at least one outboard portion, and has access to the full range of motion normally afforded to the split aileron portions. In embodiments where the split aileron 28 has two portions, the outboard portion is locked and the inboard portion moves independently thereof. In embodiments where the split aileron 28 has three portions, the middle portion can be treated as an inboard portion or an outboard portion. Alternatively, the middle portion can be locked to a neutral position, or any other suitable position.

In embodiments where the first threshold velocity $v_{t1}$ is defined as a range, the method 400 may continue to perform step 406 as the velocity moves through the range, while moving towards locking the outboard portion of the aileron, as per step 408, by progressively reducing the range of motion of the outboard portion. In embodiments where the second threshold velocity $v_{t2}$ is defined as a range, the method 400 may begin to perform step 408 by unlocking the outboard portion of the aileron at the lower bound of the range, and progressively move toward having the outboard portion of the aileron move substantially opposite from the inboard portion as the velocity of the aircraft increases. For example, if the first threshold velocity $v_{t1}$ is a range of velocities, the second aileron control signal may progressively transition the outboard aileron throughout the range of the first threshold velocity $v_{t1}$. Thus, at the lower bound of the first threshold velocity $v_{t1}$, the outboard portion may maintain the behaviour of step 406 and may move substantially in unison with the inboard portion. As the velocity v increases through the range of the first threshold velocity $v_{t1}$, a deflection ratio of the outboard portion to the inboard portion may decrease. For example, half way through the range of the first threshold velocity $v_{t1}$, the outboard portion may deflect only half as much as the inboard portion, and 75% of the way through the range of the first threshold velocity $v_{t1}$, the outboard portion may deflect only 25% as much as the inboard portion. Once the upper bound of the first threshold velocity $v_{t1}$ is reached, the outboard portion may be locked, as per step 408. Other deflection ratios, including non-linear deflection ratios, may also be used.

When the velocity v of the aircraft 10 is greater than the second velocity threshold $v_{t2}$ (and optionally, below the third velocity threshold $v_{t3}$) the method moves to step 410 and a third aileron control signal is sent. The third aileron control may be sent in similar fashion to the first and second aileron control signals. The third aileron control signal causes at least one outboard portion and at least one inboard portion to move in substantially opposite directions. Specifically, the third aileron control signal causes the outboard portion to be "counter-geared" vis-à-vis the inboard portion, so that the outboard portion is deflected in an opposite direction from the inboard portion. For example, if the third aileron control signals cause the inboard portion to be deflected upwards, the outboard portion is deflected downwards, and vice-versa. The deflection of the inboard portion follows the standard deflection for a desired motion, and the deflection of the outboard portion is reversed. Thus, to roll right, the inboard portion is deflected upwards, and the outboard portion is counter-geared to deflect downwards.

In some embodiments, the magnitude of the deflection of the inboard and outboard portions are equal, such that the overall deflections are equal but opposite. In other embodiments, the magnitude of the deflection of the outboard portion is proportional to the magnitude of the deflection of the inboard portion. For example, a scaling factor is applied to obtain the magnitude of the deflection of the outboard portion vis-à-vis the inboard portion. Thus, if the inboard portion deflects 10°, the inboard portion deflects −7.5°, for example. These values are examples, and other values may also apply.

In some embodiments, the first, second, third, and fourth aileron control signals are generated, for example by the FBW controller 32. The aileron control signals may be generated in any suitable way, and may be in any suitable format. In some embodiments, the aileron control signals are digital, and in other embodiments, the aileron control signals are analog. If the velocity v of the aircraft 10 is determined to be exactly on one of the threshold velocities $v_{t1}$, $v_{t2}$, and optionally $v_{t3}$, the decision box 405 may proceed with the lower option or with the higher option. Alternatively, the decision box 405 may rely on other factors to choose which of steps 406, 408, 410 to implement if the velocity v of the aircraft 10 is determined to be exactly on one of the threshold velocities.

In embodiments where the split aileron 28 has two portions, both portions are configured to move together when the velocity v of the aircraft 10 is below the first threshold velocity $v_{t1}$. The portion most outboard, i.e. furthest away from the fuselage 11, of the two portions is treated as the outboard portion, and the portion most inboard, i.e. closest to the fuselage 11, of the two portions is treated as the inboard portion.

In embodiments where the split aileron 28 has three portions, the three portions may be configured to move together when the velocity v of the aircraft 10 is below the first threshold velocity $v_{t1}$, or a subset of the three portions may be configured to move together. The subset may be any number of more outboard portions, one or more inboard portions and one or more most outboard portions, or any other suitable permutation of portions. Similarly, at steps 408 and 410, the at least one inboard portion may be only the most inboard portion, or the most inboard portion and the middle portion, and the at least one outboard portion may be only the most outboard portion, or the most outboard portion and the middle portion. In some embodiments where the split aileron 28 has three portions, the middle portion receives a fourth aileron control signal when the velocity v of the aircraft 10 is above the first threshold velocity $v_{t1}$ which locks the middle portion at a neutral position, or at any other suitable position. The inboard and outboard portions of the split aileron 28 may comprise fewer or more portions in embodiments where the split aileron 28 comprises more than three portions.

By progressively changing the operating state of the different portions of the split aileron 28, the reversal velocity of the aircraft 10 may be increased, which may allow the aircraft 10 to operate at higher velocities, when above the first threshold velocity $v_{t1}$ but below the second threshold velocity $v_{t2}$, locking the outboard portion of the split aileron 28 may cause the wing 14 to stiffen. Moreover, this may also move the forces applied to the wing 14 as a result of deflection of the inboard portion of the split aileron 28 to a more inboard portion of the wing 14, which itself may be stiffer. This may reduce the risk of potentially damaging torsion and/or vibrations in the wing 14. When above the second threshold velocity $v_{t2}$, counter-gearing the outboard portion of the split aileron 28 may further reduce the risk of potentially damaging torsion and/or vibrations in the wing 14, which may increase the reversal velocity even further, thus allowing the aircraft 10 to operate at higher velocities. As stated hereinabove, the method 400 may optionally begin upon receipt of a command, as per step 402; alternatively, the velocity of the aircraft may be continuously or periodically monitored, and steps 406 through 410 (as appropriate) may be executed based on velocity changes regardless of whether a steering command is sent.

Figure 6:
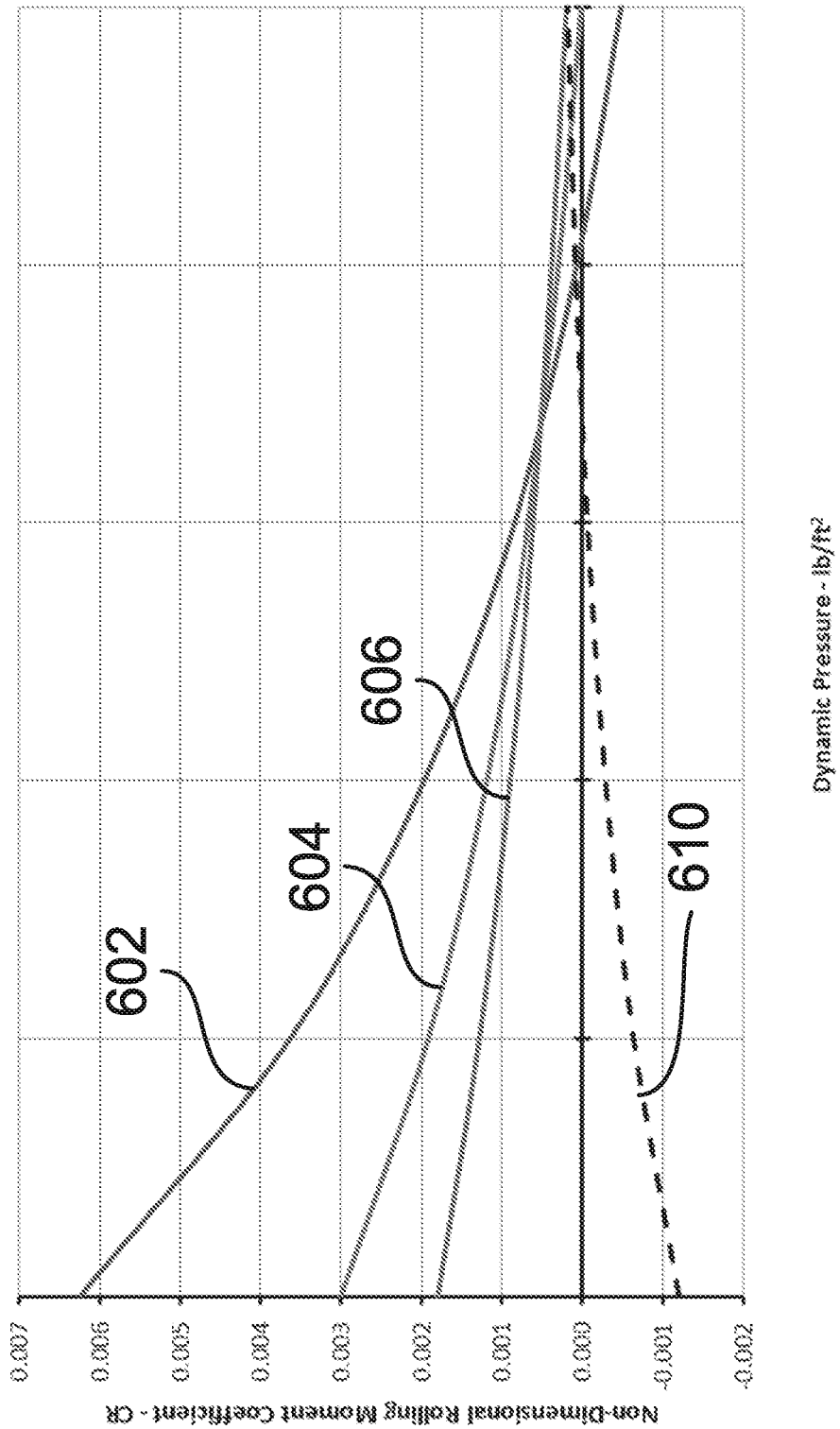
FIG. 6 is a graphical representation of aircraft parameters for different split aileron control modes.

More specifically, and with reference to FIG. 6, a non-dimensional rolling moment coefficient ("RMC") for an aircraft 10 as a function of dynamic pressure (in lb/ft$^2$) can be illustrated by one of three curves. In FIG. 6, dynamic pressure is used as a proxy for airspeed—that is to say, higher dynamic pressure more-or-less corresponds to higher aircraft velocity. Curve 602 is the RMC for the aircraft 10 when the portions of the split aileron 28 move substantially together. Curve 604 is the RMC for the aircraft 10 when the inboard portion moves independently from the outboard portion, which is locked. Curve 606 is the RMC for the aircraft when the inboard and outboard portions are counter-geared, and 610 illustrates the RMC contribution of the counter-geared outboard portion of the split aileron 28. It should be noted that the particular values illustrated in FIG. 6 are examples, and that other values may apply.

Curve 602 indicates that at low dynamic pressures, a high RMC is provided by the portions of the split aileron moving substantially together, but that at a given value of dynamic pressure, the RMC is 0, meaning that the split aileron 28 no long provides any roll moment. Above this value, curve is negative, indicating that a reversal velocity has been exceeded. Curve 604 crosses the zero-line at a higher dynamic pressure, and curve 606 at a still higher dynamic pressure. Thus, by changing the operation of the portions of the split aileron 28, the reversal velocity of the aircraft 10 may be increased, allowing operation of the aircraft 10 at high velocities.

Figure 7:
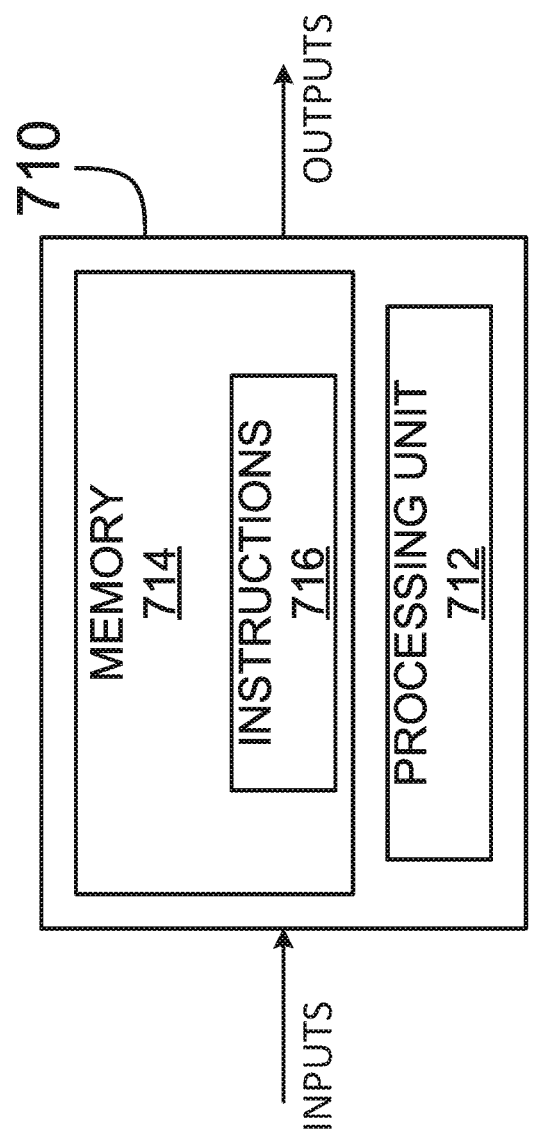
FIG. 7 is a schematic diagram of an example computing system for implementing the method of FIG. 4 in accordance with an embodiment.

With reference to FIG. 7, the method 400 may be implemented by a computing device 710, comprising a processing unit 712 and a memory 714 which has stored therein computer-executable instructions 716. The processing unit 712 may comprise any suitable devices configured to cause a series of steps to be performed so as to implement the method 400 such that instructions 716, when executed by the computing device 710 or other programmable apparatus, may cause the functions/acts/steps specified in the methods described herein to be executed. The processing unit 712 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 714 may comprise any suitable known or other machine-readable storage medium. The memory 714 may comprise non-transitory computer readable storage medium such as, for example, but not limited to, an electronic, magnetic, optical, electromagnetic, infrared, or semiconductor system, apparatus, or device, or any suitable combination of the foregoing. The memory 714 may include a suitable combination of any type of computer memory that is located either internally or externally to device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory may comprise any storage means (e.g., devices) suitable for retrievably storing machine-readable instructions executable by processing unit.

Figure 8:
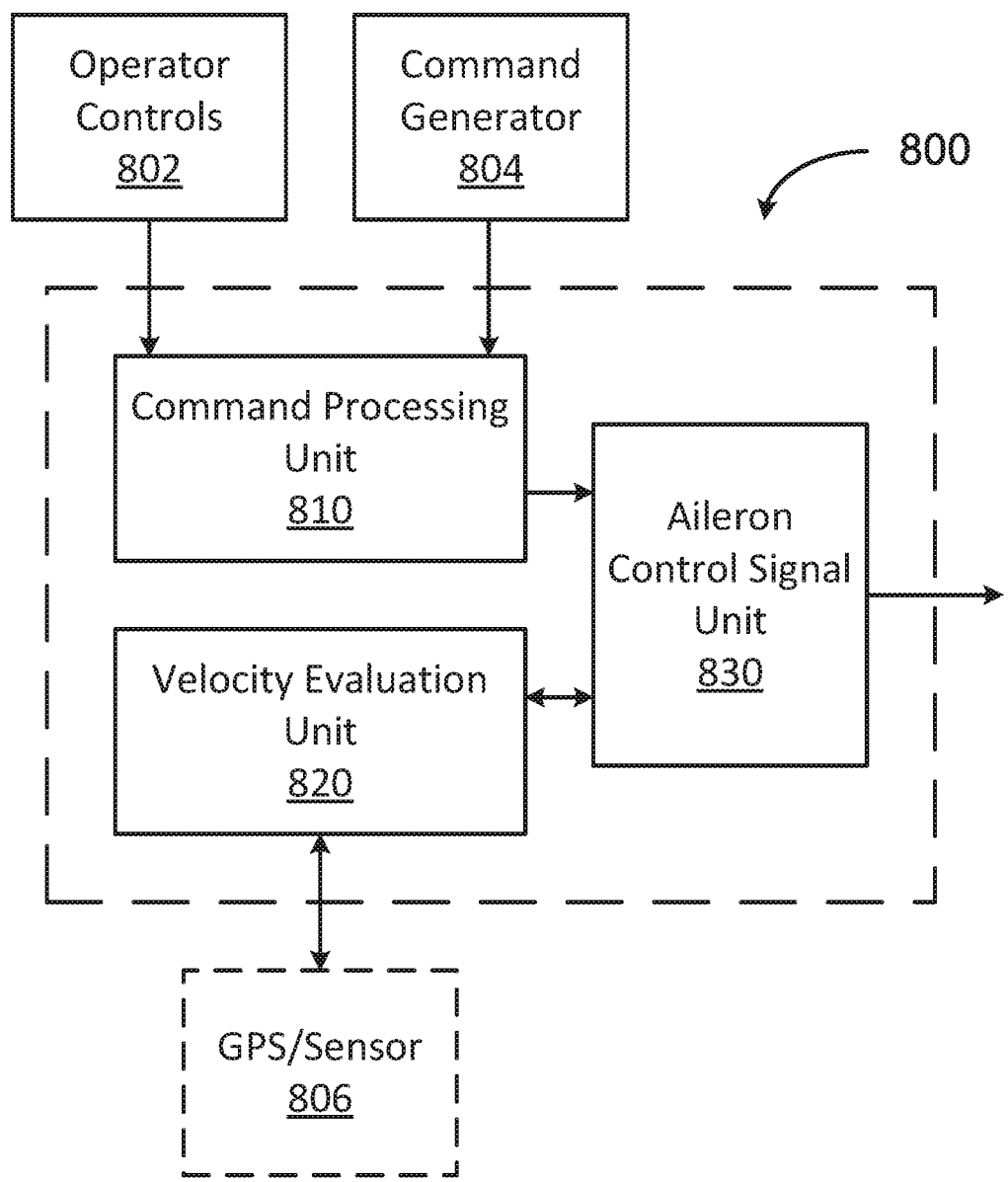
FIG. 8 is a block diagram of an example implementation of an aileron control system.

With reference to FIG. 8, an example computer-based implementation of the method 400 is illustrated as aileron control system 800. The aileron control system 800 may be included in the FBW controller 32, and includes an command processing unit 810, a velocity evaluation unit 820, and an aileron control signal unit 830. The aileron control system 800, and more specifically the command processing unit 810, is configured for optionally receiving one or more commands from the operator controls 802 and/or from the command generator 804, in accordance with step 402. The commands may be received in any suitable format, whether analog or digital, and may be representative of a desire to impart a motion to the aircraft 10 to steer the aircraft 10. The operator control 802 may be any suitable operator control, including a flight yoke, a pedal, a flight stick, a knob, button, or switch, and the like. The command generator 804 may include, for example, an autopilot system. The command processing unit 810 may process the received command to determine how the flight components 18 should be moved in order to steer the aircraft 10. When the command processing unit 810 determines that one or more split ailerons 28 need to be moved in order to steer the aircraft 10, the command processing unit 810 provides a steering indication to the aileron control signal unit 830.

When the aileron control signal unit 830 receives the steering indication from the command processing unit 810, the aileron control signal unit 830 queries the velocity evaluation unit 820 to determine the velocity v of the aircraft 10, in accordance with step 404. The velocity evaluation unit 820 is configured for providing the velocity v of the aircraft 10, for example by querying an optional GPS unit or sensor 806, or in any other suitable way. Alternatively, the velocity evaluation unit 820 already knows the velocity v of the aircraft 10. In some embodiments, when the aileron control signal unit 830 requests the velocity v of the aircraft 10, the aileron control signal unit 830 includes a timestamp of a time at which the steering indication was received from the command processing unit 810. In other embodiments, the command processing unit 810 logs a timestamp for a time at which the command was received from the operator controls 802 and/or from the command generator 804, and provides this timestamp to the aileron control signal unit 830, which is then provided to the velocity evaluation unit 820. In further embodiments, the velocity evaluation unit 820 continuously checks the velocity v of the aircraft 10, and reports the velocity v of the aircraft 10 upon receiving the query from the aileron control signal unit 830. The velocity evaluation unit 820 is configured for obtaining a velocity v of the aircraft 10 at any suitable time, including a time indicated on a timestamp, a time a certain delay before or after the timestamp, a time at which the query is received from the aileron control signal unit 830, or a time a certain delay before or after receiving the request from the aileron control signal unit 830, and the like.

The aileron control signal unit 830 then implements the decision box 405, and proceeds to perform step 406 when the velocity v of the aircraft 10 is below the first threshold velocity $v_{t1}$, to perform step 408 when the velocity v of the aircraft 10 is between the first threshold velocity $v_{t1}$ and the second threshold velocity $v_{t2}$, or to perform step 410 when the velocity v of the aircraft 10 is above the second threshold velocity $v_{t2}$. Specifically, the aileron control signal unit 830 is configured to send aileron control signals to the split aileron 28 to cause the portions of the split aileron 28 to move in one or more of the ways described hereinabove.

In some embodiments, the aileron control signal unit 830 sends the aileron control signals directly to motors/actuators (not illustrated) of the split aileron 28. In other embodiments, the aileron control signals are sent to an intermediary unit (not pictured), which translates the aileron control signals sent by the aileron control signal unit 830 into signals to be sent to the portions of the split aileron 28.

The methods and systems for controlling the operation of an aircraft aileron, such as the split aileron 28 of the aircraft 10, described herein may be implemented in a high level procedural or object oriented programming or scripting language, or a combination thereof, to communicate with or assist in the operation of a computer system, for example the computing device 710. Alternatively, the methods and circuits for controlling the operation of an aircraft described herein may be implemented in assembly or machine language. The language may be a compiled or interpreted language. Program code for implementing the methods and circuits for controlling the operation of an aircraft described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and circuits for controlling the operation of an aircraft aileron described herein may also be considered to be implemented by way of a non-transitory computer-readable storage medium having a computer program stored thereon. The computer program may comprise computer-readable instructions which cause a computer, or more specifically the at least one processing unit of the computer, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Various aspects of the methods and circuits for controlling the operation of an aircraft disclosed herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the preferred embodiments set forth in the examples, but should be given the broadest reasonable interpretation consistent with the description as a whole.

The invention claimed is:

1. A method for controlling operation of an aircraft aileron comprising an inboard portion and an outboard portion, the method comprising:

receiving an operator command for steering the aircraft from an operator control;
determining a velocity of the aircraft at a time of receipt of the operator command;
when the velocity is below a first threshold, causing the inboard aileron portion and the outboard aileron portion to move substantially in unison;
when the velocity is above the first threshold and below a second threshold greater than the first threshold, causing the outboard portion of the aileron to lock and causing the inboard portion of the aileron to move independently from the outboard portion; and
when the velocity is above the second threshold, causing the outboard portion of the aileron to move substantially opposite from the inboard portion.

2. The method of claim 1, further comprising:
when the velocity is below the first threshold, generating and transmitting a first aileron control signal for causing the inboard portion to move independently from the outboard portion;
when the velocity is above the first threshold and below the second threshold, generating and transmitting a second aileron control signal for causing the inboard portion of the aileron to move independently from the outboard portion; and
when the velocity is above the second threshold, generating and transmitting a third aileron control signal for causing the outboard portion of the aileron to move substantially opposite from the inboard portion.

3. The method of claim 1, wherein the aileron comprises a middle portion, the method further comprising, when the velocity is below a first threshold, causing the middle portion, the inboard portion and the outboard portion to move substantially in unison.

4. The method of claim 3, further comprising generating and transmitting a fourth aileron control signal for effecting control of the middle portion.

5. The method of claim 1, wherein the aileron comprises a middle portion, the method further comprising, when the velocity is above the first threshold, causing the middle portion to lock.

6. The method of claim 1, further comprising receiving an autopilot command for steering the aircraft, and wherein determining the velocity of the aircraft comprises re-determining the velocity at a time of receipt of the autopilot command.

7. The method of claim 1, wherein at least one of the first threshold and the second threshold is computed dynamically based on at least one of an altitude, a Mach number, and environmental conditions for the aircraft.

8. A system for controlling operation of an aircraft aileron comprising an inboard portion and an outboard portion, the system comprising:
a processing unit; and
a non-transitory computer-readable media communicatively coupled to the processing unit and comprising computer-readable program instructions executable by the processing unit for:
receiving an operator command for steering the aircraft from an operator control;
determining a velocity of the aircraft at a time of receipt of the operator command; and
when the velocity is below a first threshold, causing the inboard aileron portion and the outboard aileron portion to move substantially in unison;
when the velocity is above the first threshold and below a second threshold, causing the outboard portion of the aileron to lock and causing the inboard portion of the aileron to move independently from the outboard portion; and when the velocity is above the second threshold, causing the outboard portion of the aileron to move substantially opposite from the inboard portion.

9. The system of claim 8, the program instructions being further executable by the processing unit for:

when the velocity is below the first threshold, generating and transmitting a first aileron control signal for causing the inboard portion to move independently from the outboard portion;

when the velocity is above the first threshold and below the second threshold, generating and transmitting a second aileron control signal for causing the inboard portion of the aileron to move independently from the outboard portion; and when the velocity is above the second threshold, generating and transmitting a third aileron control signal for causing the outboard portion of the aileron to move substantially opposite from the inboard portion.

10. The system of claim 8, wherein the aileron comprises a middle portion, the program instructions being further executable for, when the velocity is below a first threshold, causing the middle portion, the inboard portion and the outboard portion to move substantially in unison.

11. The system of claim 10, the program instructions being further executable by the processing unit for generating and transmitting a fourth aileron control signal for effecting control of the middle portion.

12. The system of claim 8, wherein the aileron comprises a middle portion, the program instructions being further executable for, when the velocity is above the first threshold, causing the middle portion to lock.

13. The system of claim 8, the program instructions being further executable by the processing unit for receiving an autopilot command for steering the aircraft, and wherein determining the velocity of the aircraft comprises re-determining the velocity at a time of receipt of the autopilot command.

14. The system of claim 8, wherein at least one of the first threshold and the second threshold is computed dynamically based on at least one of an altitude, a Mach number, and environmental conditions for the aircraft.

15. The system of claim 8, wherein at least one of the first threshold and the second threshold is determined via a lookup table.

16. The system of claim 8, wherein the second threshold is approximately a maximum operating velocity of the aircraft.

17. The system of claim 16, wherein the maximum operating velocity of the aircraft is defined as approximately 85% of a dive velocity of the aircraft.

18. The system of claim 8, wherein at least one of the first threshold and the second threshold is defined as a percentage of a reversal velocity of the aircraft in a given operating mode of the aileron.

19. The system of claim 8, wherein sending the at least one third aileron control signal is performed when the velocity is above the second threshold and below a third threshold.

20. The system of claim 19, wherein the third threshold is a dive velocity of the aircraft.

21. The system of claim 8, wherein at least one of the first threshold and the second threshold is a range.

22. The system of claim 21, wherein the first threshold is a range having a lower bound and an upper bound, the program instructions being further executable for, between the lower bound and the upper bound of the range of the first threshold, causing the outboard portion of the aileron to progressively lock and causing the inboard portion of the aileron to move independently from the outboard portion.

23. The system of claim 22, wherein causing the outboard portion of the aileron to progressively lock comprises changing a deflection ratio of the outboard portion of the aileron to the inboard portion of the aileron as a function of the velocity of the aircraft.

* * * * *